United States Patent
Matsumoto

(10) Patent No.: US 7,327,799 B2
(45) Date of Patent: Feb. 5, 2008

(54) WIRELESS MOBILE STATION AND SYSTEM IN WHICH RAKE UNIT AND FINGER UNITS PERFORM A SHARED ARITHMETIC OPERATION

(75) Inventor: Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 717 days.

(21) Appl. No.: 10/334,795

(22) Filed: Jan. 2, 2003

(65) Prior Publication Data
US 2003/0153350 A1 Aug. 14, 2003

(30) Foreign Application Priority Data
Jan. 9, 2002 (JP) ............................. 2002-002607

(51) Int. Cl.
*H04B 7/02* (2006.01)
*H04L 1/02* (2006.01)
(52) U.S. Cl. .................................... 375/267
(58) Field of Classification Search ............... 375/267, 375/316, 349
See application file for complete search history.

(56) References Cited

U.S. PATENT DOCUMENTS

| | | | |
|---|---|---|---|
| 5,079,512 A | | 1/1992 | Muto |
| 6,115,406 A | * | 9/2000 | Mesecher ................... 375/130 |
| 7,154,958 B2 | * | 12/2006 | Dabak et al. ............... 375/267 |
| 2002/0018530 A1 | * | 2/2002 | Kim et al. .................. 375/267 |

FOREIGN PATENT DOCUMENTS

| | | | |
|---|---|---|---|
| GB | 2 313 985 A | * | 10/1997 |
| GB | 2313985 A | | 12/1997 |
| JP | 11-252633 | | 9/1999 |
| JP | 2000-78111 | | 3/2000 |
| JP | 2000-83010 | | 3/2000 |
| JP | 2000-252959 | | 9/2000 |
| JP | 2001-069050 | | 3/2001 |
| JP | 2001-168777 | | 6/2001 |
| JP | 2001-358621 | | 12/2001 |
| WO | WO 01/01594 | | 1/2001 |
| WO | WO 01/13547 A1 | | 2/2001 |
| WO | WO 01/59937 A2 | * | 8/2001 |

OTHER PUBLICATIONS

"Universal Mobile Telecommunications Systems (UMTS); Physical Layer Procedures", 3GPP TS 25.214 V 3.4.0 R1999.*
D. Holma et al., "UMTS Services and Applications", WCDMA for UMTS; (2001) Chichester: John Wiley & Sons Ltd. Great Britain.
Universal Mobile Telecommunications System (UMTS); Physical Layer Procedures (FDD) (3GPP TS 25.214 Version 3.4.0 Release 1999) ETSI TS 125 214 V3.4.0 Sep. 1999, pp. 1-48 (XP002166612).

* cited by examiner

*Primary Examiner*—David C. Payne
*Assistant Examiner*—Aslan Ettehadieh
(74) *Attorney, Agent, or Firm*—Foley & Lardner LLP

(57) ABSTRACT

A wireless mobile station comprising: a plurality of finger units for performing spread demodulation of a downstream signal transmitted from a base station through a transmission channel; and a rake unit for combining the spread-demodulated downstream signals which are outputted from each of the finger units, wherein both of the finger units and the rake unit share and perform arithmetic operation for compensating channel estimation of the spread-demodulated downstream signal.

1 Claim, 5 Drawing Sheets

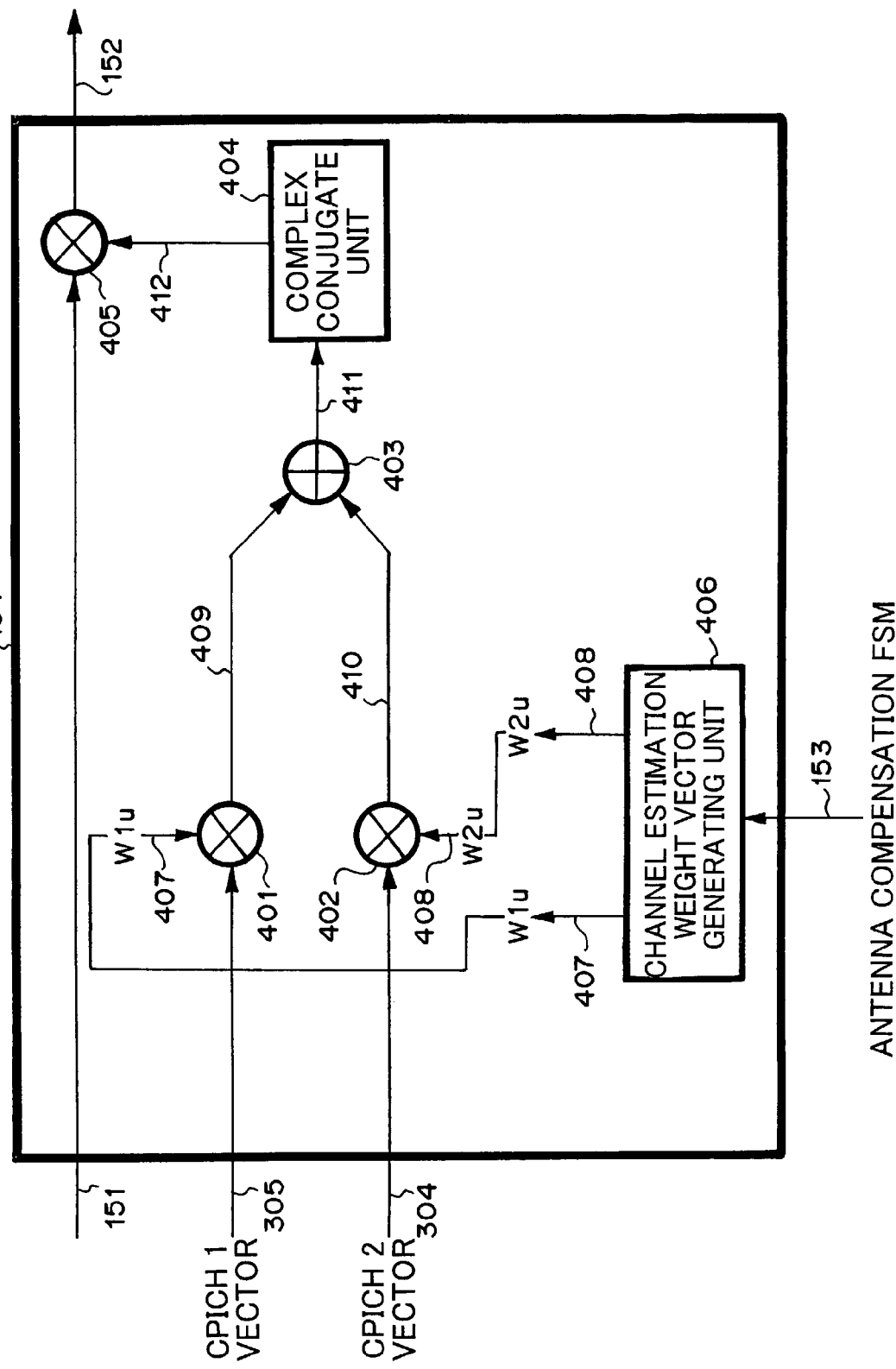

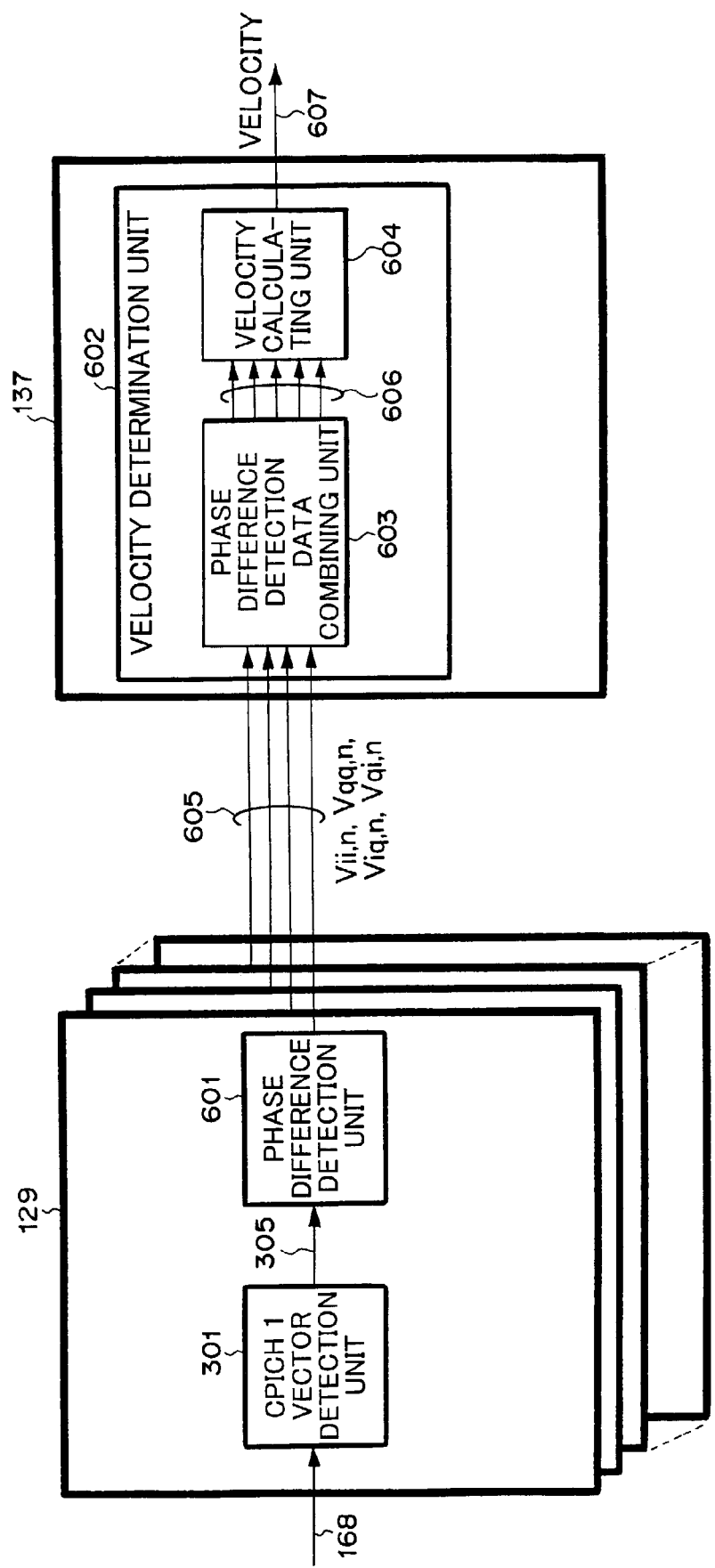

WIRELESS MOBILE STATION AND SYSTEM IN WHICH RAKE UNIT AND FINGER UNITS PERFORM A SHARED ARITHMETIC OPERATION

BACKGROUND OF THE INVENTION

1. Field of the Invention

The present invention relates to a wireless mobile station and a wireless communication system with the same. More specifically, the present invention relates to a wireless mobile station in a wireless communication system, which employs transmission diversity, and a wireless communication system with the same.

2. Description of the Related Art

Conventionally, transmission diversity in which more than two transmission channels for transmitting downstream signals are set and channel estimation have been used in the CDMA wireless system in order that the downstream signals transmitted from a base station can be received in a wireless mobile station such as a mobile phone with good sensitivity.

However, in the conventional technique, for the purpose of antenna detection, operations such as comparisons for all of the 16 kinds of vectors composed of two elements, that is, phase and amplitude of the downstream signals are performed in conformity with the rule in a plurality of fingers in the CDMA wireless mobile station. Therefore, the amount of arithmetic operation performed in each of the fingers becomes enormous in some cases.

In the case where the amount of arithmetic operation becomes enormous, the lifetime of an electric battery used in the CDMA wireless mobile station becomes short. Therefore, it is necessary to increase the size of the battery. For its prevention, it is desired to simplify the above-mentioned arithmetic operation.

In addition, in the CDMA wireless mobile station, an FSM signal is generated in order to control the strength of the downstream signal, and the generated signal is fed back to the base station. However, if the FSM signal is overlapped with a noise or the FSM signal is deteriorated during the transmission through a transmission channel, the signal different from the original FSM signal is received in the CDMA wireless base station. In such a case, since the FSM signal used in the CDMA wireless base station and the FSM signal used in the channel estimation in the CDMA wireless mobile station are not equal to each other, the reception characteristics thereof are deteriorated in some cases. As a result, it becomes necessary to perform the antenna detection.

SUMMARY OF THE INVENTION

For the solution of the above-mentioned problems, an aspect of the present invention is to provide a wireless mobile station comprising: a plurality of finger units for performing spread demodulation of a downstream signal transmitted from a base station through a transmission channel; and a rake unit for combining the spread-demodulated downstream signals which are outputted from each of the finger units, wherein both of the finger units and the rake unit share and perform arithmetic operation for compensating channel estimation of the spread-demodulated downstream signal.

Another aspect of the present invention is to provide a wireless communication system comprising: the wireless mobile station; and a wireless base station for transmitting the downstream signal to the wireless mobile station.

BRIEF DESCRIPTION OF THE DRAWINGS

FIG. 4 is a block diagram showing a schematic internal configuration of the channel compensation/estimation unit 134 shown in FIG. 1; and FIG. 5 is a block diagram showing a schematic internal configuration of a finger unit 129 and a rake unit 137 according to the second embodiment of the present invention.

DESCRIPTION OF THE PREFERRED EMBODIMENTS

Modes of embodiment of the present invention will be described below with reference to the accompanying drawings.

1. First Embodiment

[Description of Configuration]

Figure 1:
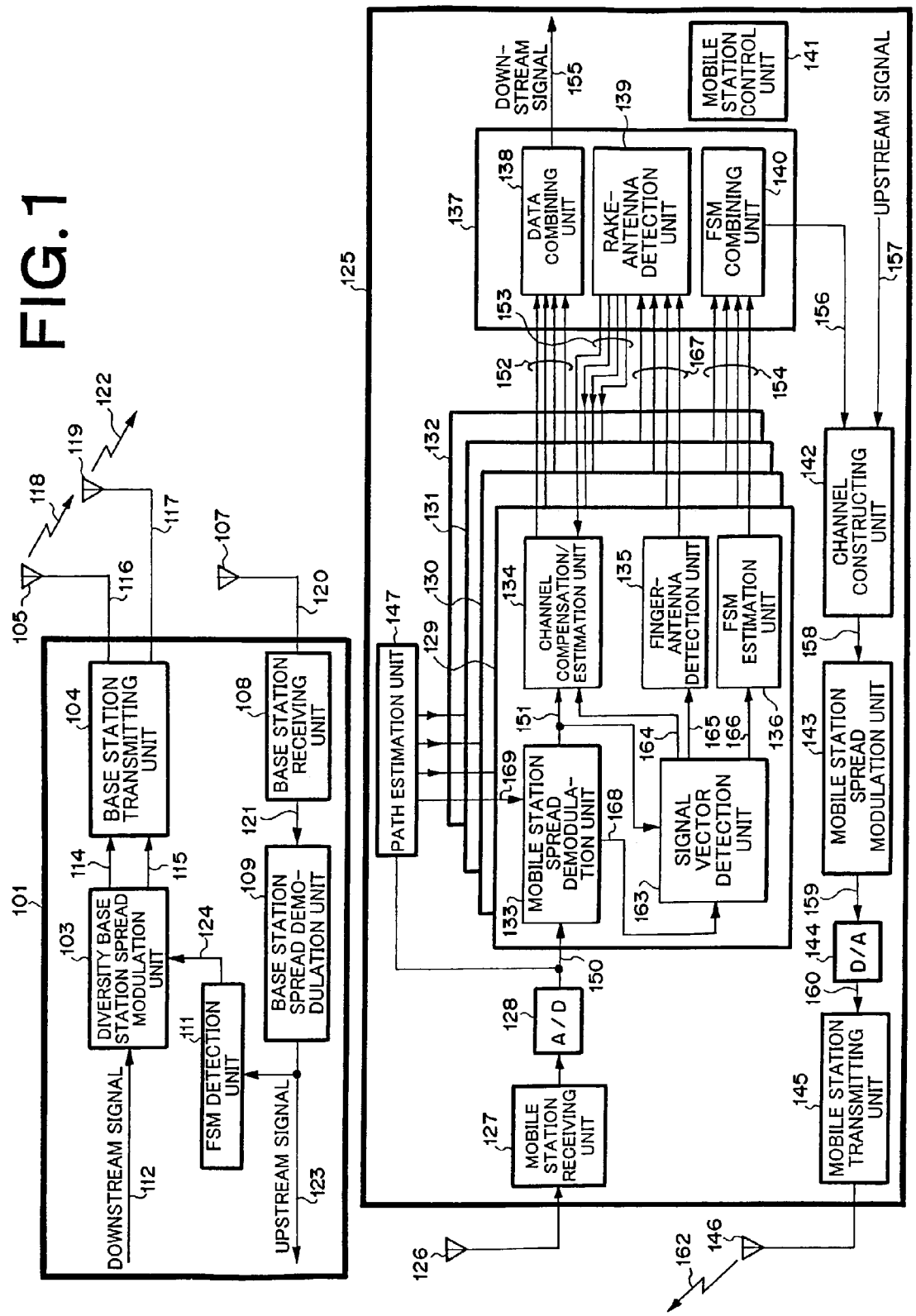
FIG. 1 is a block diagram showing a schematic configuration of a wireless communication system according to the first embodiment of the present invention.

FIG. 1 is a block diagram showing a schematic configuration of a wireless communication system according to the first embodiment of the present invention. A CDMA wireless base station 101 and a CDMA wireless mobile station 125 described later are shown in FIG. 1.

The CDMA wireless base station 101 comprises: a diversity base station spread modulation unit 103 for spread-modulating a downstream signal; a base station transmitting unit 104 for transmitting the downstream signal spread-modulated in the diversity base station spread modulation unit 103 to the CDMA wireless mobile station 125; a base station first transmitting antenna unit 105 and a base station second transmitting antenna unit 119 for a base station diversity; a base station receiving antenna unit 107 and a base station receiving unit 108 for receiving a radio wave transmitted from the CDMA wireless mobile station 125; a base station spread demodulation unit 109 for spread-demodulating an upstream signal received in the base station receiving unit 108; an FSM detection unit 111 for detecting an FSM signal from the upstream signal spread-demodulated in the base station spread demodulation unit 109.

The CDMA wireless mobile station 125 comprises: a mobile station receiving antenna unit 126 and a mobile station receiving unit 127 for receiving a radio wave transmitted from the CDMA wireless base station 101; an A/D converter 128 for converting an analog signal to a digital signal by sampling the downstream signal received in the mobile station receiving unit 127; a path estimation unit 147 for estimating a path from the downstream signal converted in the A/D converter 128; for example four finger units 129 to 132 for demodulating the signal of the path based on the estimation result in the path estimation unit 147; a rake unit 137 for combining the signals from the finger units 129 to 132; a channel constructing unit 142 for reconstructing the downstream signal into a channel structure; a mobile station spread modulation unit 143 for performing the spread modulation; a D/A converter 144 for converting a digital signal into an analog signal; a mobile station transmitting unit 145 and a mobile station transmitting antenna unit 146 for transmitting a radio wave to the CDMA wireless base station 101; and a mobile station control unit 141 for controlling an operation of the CDMA wireless mobile station 125 itself.

The configuration of the finger units 129 to 132 will be described later by the use of FIG. 3. Note that it is possible to use a larger number (five or more) and a smaller number (three or less) of the finger units in an actual case. In this example, however, a case where four finger units are used will be described.

The rake unit 137 includes: a data combining unit 138 for combining data transmitted from the finger units 129 to 132; a rake-antenna detection unit 139 used for the antenna diversity; and an FSM combining unit 140.

Figure 2:
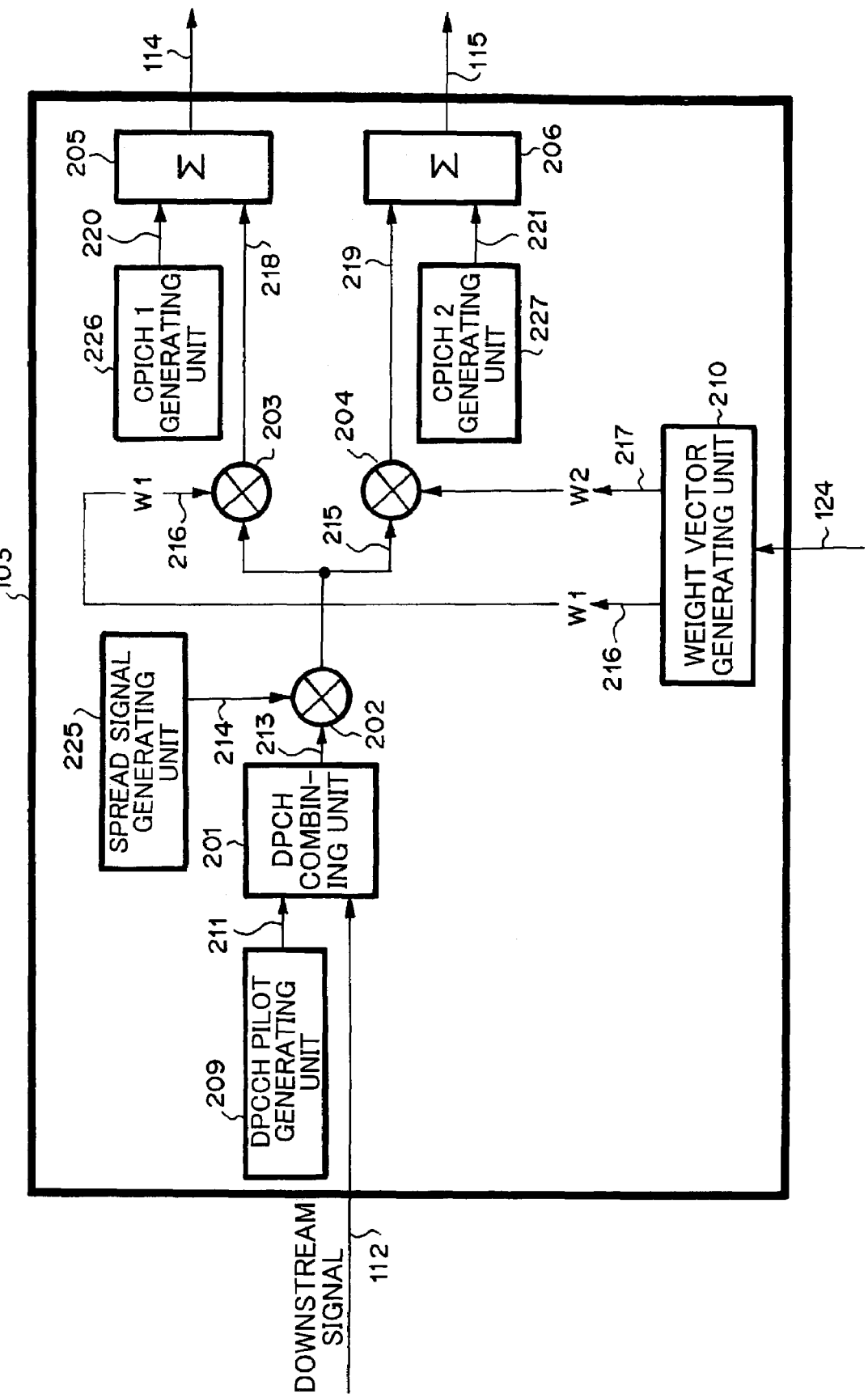
FIG. 2 is a block diagram showing a schematic internal configuration of the diversity base station spread modulation unit 103 shown in FIG. 1.

FIG. 2 is a block diagram showing a schematic internal configuration of the diversity base station spread modulation unit 103 in FIG. 1. FIG. 2 shows a DPCCH pilot generating unit 209 for generating a predetermined dedicated physical control channel pilot (hereinafter, referred to as "DPCCH pilot") signal 211, a dedicated physical channel (hereinafter, referred to as "DPCH") combining unit 201 for combining the DPCCH pilot signal 211 generated in the DPCCH pilot generating unit 209 and the downstream signal 112; a mixer 202 for multiplying a combined signal 213 generated in the DPCH combining unit 201 and a spread signal 214 generated from a spread signal generating unit 225 to perform the spread modulation; a weight vector generating unit 210 for generating weights $w_1$ 216 and $w_2$ 217 based on the detection signal from the FSM detection unit 111; mixers 203 and 204 for multiplying the spread modulation signal from the mixer 202 and the weights $w_1$ 216 and $w_2$ 217 generated in the weight vector generating unit 210; a CPICH 1 generating unit 226 and a CPICH 2 generating unit 227 for generating a well-known common pilot channel (hereinafter, referred to as "CHICH") 1 signal 220 and a CPICH 2 signal 221, respectively; and adding units 205 and 206 for adding the CPICH 1 signal 220 and the CPICH 2 signal 221 generated in the CPICH 1 generating unit 226 and the CPICH 2 generating unit 227 to the spread modulation signals 218 and 219 generated in the mixers 203 and 204 so as to generate downstream signals 114 and 115.

Figure 3:
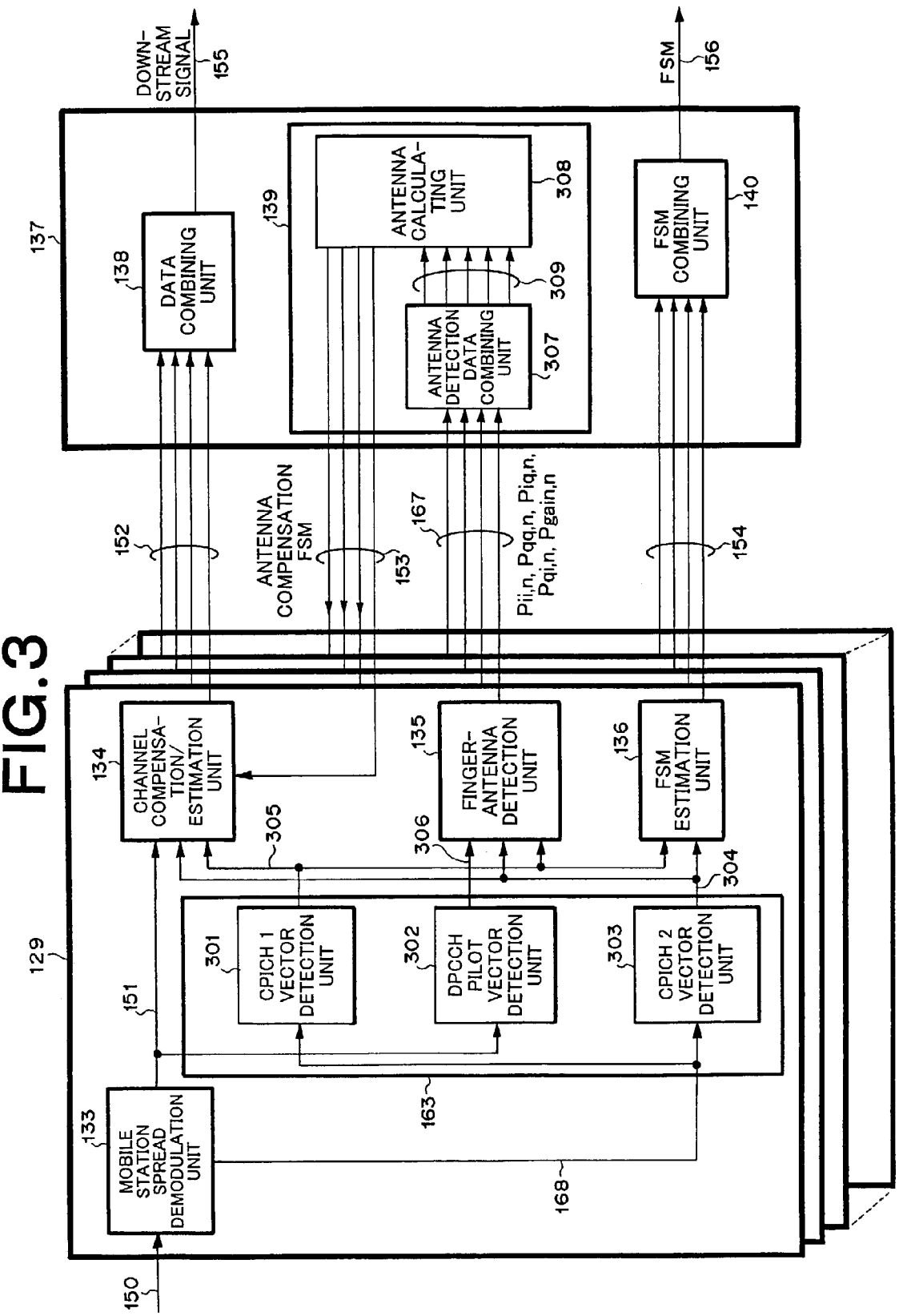
FIG. 3 is a block diagram showing a schematic internal configuration of the finger unit 129 and that of the rake unit 137 shown in FIG. 1.

FIG. 3 is a block diagram showing a schematic configuration of the finger unit 129 and that of the rake unit 137 shown in FIG. 1. The finger unit 129 includes: a mobile station spread demodulation unit 133; a signal vector detection unit 163 for estimating influences in a transmission channel; a channel compensation/estimation unit 134 for reducing the influences in a transmission channel and compensating the influences for a transmission diversity from the signal vector detected in the signal vector detection unit 163; a finger-antenna detection unit 135 used for the antenna diversity; and an FSM estimation unit 136 for changing the weight vectors $w_1$ 216 and $w_2$ 217 so as to maximize the signal power received through the transmission channel.

The signal vector detection unit 163 includes: a CPICH 1 vector detection unit 301; a CPICH 2 vector detection unit 303; and a DPCCH pilot vector detection unit 302 for multiplying a complex conjugate having a predetermined pattern and performing processes for smoothing such as filtering and averaging by the use of signals during a certain period of time to fetch vectors with high accuracy, thereby estimating the characteristics of a transmission channel and frequency deviation between the transmission and reception.

The CPICH 1 vector detection unit 301 detects a CPICH 1 vector 305 from a CPICH spread demodulation signal 168. The CPICH 2 vector detection unit 303 detects a CPICH 2 vector 304 from the CPICH spread demodulation signal 168. The DPCCH pilot vector detection unit 302 detects a DPCCH pilot vector 306 from a DCH spread demodulation signal 151.

Also, the rake-antenna detection unit 139 includes: an antenna detection data combining unit 307 for combining the signals transmitted from the finger units 129 to 132; and an antenna calculating unit 308 for calculating an antenna compensation FSM 153 based on combined signals 309 combined in the antenna detection data combining unit 307.

FIG. 4 is a block diagram showing a schematic internal configuration of the channel compensation/estimation unit 134 shown in FIG. 1. FIG. 4 shows a channel estimation weight vector generating unit 406 for generating weight vectors $w_{1u}$ 407 and $w_{2u}$ 408 based on the antenna compensation FSM 153; mixers 401 and 402 for multiplying the weight vectors $w_{1u}$ 407 and $w_{2u}$ 408 generated in the channel estimation weight vector generating unit 406 and the CPICH 1 vector 305 and the CPICH 2 vector 304 transmitted from the CPICH 1 vector detection unit 301 and the CPICH 2 vector detection unit 303; an adding unit 403 for combining signals 409 and 410 multiplied in the mixers 401 and 402; a complex conjugate unit 404 for changing a signal 411 combined in the adding unit 403 into a complex conjugate vector; and a mixer 405 for obtaining a channel estimated signal 152 by multiplying a signal 412 from the complex conjugate unit 404 and a DCH spread demodulation signal 151.

[Description of Operation]

Next, an operation of the wireless communication system shown in FIG. 1 will be described.

First, a case where a downstream signal is transmitted from the CDMA wireless base station 101 to the CDMA wireless mobile station 125 will be described.

In the CDMA wireless base station 101, the downstream signal 112 from an encoding unit (not shown) is spread-modulated in the diversity base station spread modulation unit 103, and the spread demodulated signals 114 and 115 are outputted to the base station transmitting unit 104.

More specifically, the downstream signal 112 and the DPCCH pilot signal 211 generated from the DPCCH pilot generating unit 209 are combined in the DPCH combining unit 201 shown in FIG. 2, and the combined signal 213 is outputted to the mixer 202.

The mixer 202 performs the spread modulation by multiplying the combined signal 213 outputted from the DPCH combining unit 201 and the spread signal 214 generated from the spread signal generating unit 225, and outputs the spread modulated signal 217 to the mixers 203 and 204 in parallel.

In this case, the weight vector generating unit 210 generates the weight vectors $w_1$ 216 and $w_2$ 217 based on the FSM signal 124 outputted from the later described FSM detection unit 111, and outputs the weight vectors $w_1$ 216 and $w_2$ 217 to the mixers 203 and 204.

The mixers 203 and 204 multiply the spread modulated signal 217 from the mixer 202 and the weight vectors $w_1$ 216 and $w_2$ 217 generated in the weight vector generating unit 210, and then, outputs them to the adding units 205 and 206, respectively.

In this case, the CPICH 1 generating unit 226 and the CPICH 2 generating unit 227 generate the given CPICH 1 signal 220 and the CPICH 2 signal 221, respectively, and then, output the CPICH 1 signal 220 and the CPICH 2 signal 221 to the adding units 205 and 206.

The adding units 205 and 206 add the signals 218 and 219 from the mixers 203 and 204 to the CPICH 1 signal 220 and the CPICH 2 signal 221 from the CPICH 1 generating unit 226 and the CPICH 2 generating unit 227, thereby generating the added signals 114 and 115, and then, output the added signals 114 and 115 to the base station transmitting unit 104.

The base station transmitting unit 104 converts the added signals 114 and 115 from the adding units 205 and 206 into a radio frequency signal, and the radio frequency signal is transmitted to the CDMA wireless mobile station 125 as radio waves 118 and 122 through the two antenna units for diversity, that is, the base station first transmitting antenna unit 105 and the base station second transmitting antenna unit 119 via different transmission channels, respectively.

In the CDMA wireless mobile station 125, the mobile station receiving antenna unit 126 and the mobile station receiving unit 127 receive the radio waves 118 and 122 from the CDMA wireless base station 101, and output it as the signal 149 to the A/D converter 128.

The A/D converter 128 samples the signal 149 from the mobile station receiving antenna unit 126 and the mobile station receiving unit 127 to extract a digital signal 150, and then, outputs the digital signal 150 to the path estimation unit 147 and the finger units 129 to 132 in parallel.

The path estimation unit 147 estimates a path of a transmission channel based on the digital signal 150 from the A/D converter 128, and then, outputs it as a path estimation data 169 to the finger units 129 to 132.

The finger units 129 to 132 performs the spread demodulation in the mobile station spread demodulation unit 133 at a timing in accordance with the path estimation data 169 outputted from the path estimation unit 147, and then, outputs it as the DCH spread demodulation signal 151 to the signal vector detection unit 163 and the channel compensation/estimation unit 134 in parallel. In addition, the mobile station spread demodulation unit 133 outputs the CPICH spread demodulation signal 168 to the signal vector detection unit 163.

In the signal vector detection unit 163, the CPICH 1 vector detection unit 301 and the CPICH 2 vector detection unit 303 detect the CPICH 1 vector 305 and the CPICH 2 vector 304 from the CPICH spread demodulation signal 168 outputted from the mobile station spread demodulation unit 133, and then, output the CPICH 1 vector 305 and the CPICH 2 vector 304 to the channel compensation/estimation unit 134, the finger-antenna detection unit 135, and the FSM estimation unit 136 in parallel.

In addition, in the signal vector detection unit 163, the DPCCH pilot vector detection unit 302 detects the DPCCH pilot vector 306 from the DCH spread demodulation signal 151 outputted from the mobile station spread demodulation unit 133, and then, outputs the DPCCH pilot vector 306 to the finger-antenna detection unit 135.

The finger-antenna detection unit 135 performs an arithmetic operation described later based on the CPICH 1 vector 305 and the CPICH 2 vector 304 outputted from the CPICH 1 vector detection unit 301 and the CPICH 2 vector detection unit 303 and the DPCCH pilot vector 306 outputted from the DPCCH pilot vector detection unit 302, and outputs a signal 167 representing the result of the arithmetic operation to the antenna detection data combining unit 307 of the rake-antenna detection unit 139 in the rake unit 137.

The antenna detection data combining unit 307 combines the signals 167 outputted from the finger units 129 to 132, and outputs the combined signals to the antenna calculating unit 308.

The antenna calculating unit 308 performs an arithmetic operation described later based on the combined signals 309 from the antenna detection data combining unit 307, and outputs the antenna compensation FSM 153 representing the result of the arithmetic operation to the channel compensation/estimation unit 134 of the finger units 129 to 132. The operation of the channel compensation/estimation unit 134 will be described later.

Furthermore, the FSM estimation unit 136 transmits an estimation value signal 154 based on the CPICH 1 vector 305 and the CPICH 2 vector 304 to the FSM combining unit 140 of the rake unit in order to change the weight vectors $w_1$ and $w_2$ so as to maximize the signal power received through the transmission channel.

The FSM combining unit 140 combines the estimation value signals 154 outputted from the finger units 129 to 132 to select the FSM, and then, outputs the selected FSM 156 to the channel constructing unit 142.

In the channel compensation/estimation unit 134, the channel estimation weight vector generating unit 406 generates the weight vectors $w_{1u}$ 407 and $w_{2u}$ 408 based on the antenna compensation FSM 153 outputted from the antenna calculating unit 308 in the same process as that in the weight vector generating unit 210 of the CDMA wireless base station 101, and then, outputs the weight vectors $w_{1u}$ 407 and $w_{2u}$ 408 to the mixers 401 and 402, respectively.

The mixers 401 and 402 multiply the weight vectors $w_{1u}$ 407 and $w_{2u}$ 408 generated in the channel estimation weight vector generating unit 406 by the CPICH 1 vector 305 and the CPICH 2 vector 304 outputted from the CPICH 1 vector detection unit 301 and the CPICH 2 vector detection unit 303, and then, outputs the resultant signals 409 and 410 to the adding unit 403.

The adding unit 403 combines the signals 409 and 410 outputted from the mixers 401 and 402, and outputs the combined signal 411 to the complex conjugate unit 404.

The complex conjugate unit 404 changes the combined signal to a complex conjugate vector, and outputs the resultant signal 412 to the mixer 405.

The mixer 405 obtains the channel estimated signal 152 by multiplying the signal 412 outputted from the complex conjugate unit 404 by the DCH spread demodulation signal 151 outputted from the mobile station spread demodulation unit 133, and then, outputs the channel estimated signal 152 to the data combining unit 138.

The data combining unit 138 combines the channel estimated signals 152 received from the finger units 129 to 132, and outputs a combined signal, that is, the downstream signal 155 to a decoding unit (not shown).

In addition, the channel constructing unit 142 combines the FSM signal 156 outputted from the FSM combining unit 140 and an upstream signal 157 outputted from the encoding unit (not shown) to generate a signal 158 having a packet structure suitable for the wireless system, and then, outputs the signal 158 to the mobile station spread modulation unit 143.

The mobile station spread modulation unit 143 performs the spread modulation of the signal 158 outputted from the channel constructing unit 142, and outputs a spread modulated signal 159 to the D/A converter 144.

The D/A converter 144 converts the spread modulated signal 159 from the mobile station spread modulation unit 143 from a digital signal into an analog signal, and outputs it as a spread modulation signal 160 to the mobile station transmitting unit 145.

The mobile station transmitting unit 145 converts the spread modulation signal 160 from the D/A converter 144 into a radio frequency signal, and outputs it as a radio wave 162 to the CDMA wireless base station 101 through the mobile station transmitting antenna unit 146.

In the CDMA wireless base station 101, the base station receiving antenna unit 107 receives the radio wave 162 from the CDMA wireless mobile station, and the base station receiving unit 108 converts the radio wave 162 into a baseband frequency, that is, a signal 121, and then, the signal 121 is outputted to the base station spread demodulation unit 109.

The base station spread demodulation unit 109 despreads the signal 121 outputted from the base station receiving unit 108, and outputs it as an upstream signal 123 to the FSM detection unit 111 and the decoding unit (not shown).

The FSM detection unit 111 detects the FSM from the upstream signal 123 despread in the base station spread demodulation unit 109, and outputs the detected FSM signal 124 to the diversity base station spread modulation unit 103.

In the diversity base station spread modulation unit 103, the weight vector generating unit 210 calculates the weight vectors $w_1$ 216 and $w_2$ 217 from the FSM from the FSM detection unit 111.

Next, a method of calculating the weight vectors $w_1$ 216 and $w_2$ 217 in the weight vector generating unit 210 will be described.

Tables 1 to 3 show the relationship between the FSM and the weight vectors $w_1$ and $w_2$. As shown in the tables 1 to 3, two modes, that is, a mode 1 and a mode 2 are prepared in advance, and either one of the two modes is selected when performing the communication.

In the mode 1, the weight vector $w_1$ and the weight vector w2 are determined in the following manner.

TABLE 2

| $FSM_{po}$ | Power_ant1 | Power_ant2 |
|---|---|---|
| 0 | 0.2 | 0.8 |
| 1 | 0.8 | 0.2 |

TABLE 3

| $FSM_{ph}$ | Phase difference between antennas (radians) |
|---|---|
| 000 | $\pi$ |
| 001 | $-3\pi/4$ |
| 011 | $-\pi/2$ |
| 010 | $-\pi/4$ |
| 110 | 0 |
| 111 | $\pi/4$ |
| 101 | $\pi/2$ |
| 100 | $3\pi/4$ |

The table 2 shows FSM powers $FSM_{po}$ and powers of an antenna (power antenna: Power_ant 1 and Power_ant 2) each corresponding to the FSM powers and representing the data including phase and power of the transmission power from the base station first transmitting antenna unit 105 and the base station second transmitting antenna unit 119.

In this embodiment, the case is exemplified where the power of the base station first transmitting antenna unit 105 is 0.2 and that of the base station second transmitting

TABLE 1

| Slot # | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| FSM 0 | 0 | 0 | $\pi/2$ | 0 | $\pi/2$ | 0 | $\pi/2$ | 0 | $\pi/2$ | 0 | $\pi/2$ | 0 | $\pi/2$ | 0 | $\pi/2$ | 0 |
|     1 | $\pi$ | $-\pi/2$ | $\pi$ | $-\pi/2$ | $\pi$ | $-\pi/2$ | $\pi$ | $-\pi/2$ | $\pi$ | $-\pi/2$ | $\pi$ | $-\pi/2$ | $\pi$ | $-\pi/2$ | $\pi$ |

The table 1 shows slots 0 to 14, which are counted up from 0 to 14 in a unit of time, and the phases of FSM 0 and FSM 1 each corresponding to the slots.

The weight vector $w_1$ and the weight vector $w_2$ are generated in accordance with the table 1 and the expressions (1) to (3) shown below.

$$w_1 = \frac{1}{\sqrt{2}} \quad (1)$$

$$w_2 = \frac{\sum_{i=n-1}^{n} \cos(\phi_i)}{2} + \frac{\sum_{i=n-1}^{n} \sin(\phi_i)}{2} \quad (2)$$

$$\phi \in \{0, \pi, \pi/2, -\pi/2\} \quad (3)$$

In the mode 2, the weight vector $w_1$ and the weight vector $w_2$ are determined in the following manner. That is, the weight vectors $w_1$ and $w_2$ representing the data including phase and power are generated, while setting the four bits of the FSM as one unit.

antenna unit 119 is 0.8 when the $FSM_{po}$ is 0, and the power of the base station first transmitting antenna unit 105 is 0.8 and that of the base station second transmitting antenna unit 119 is 0.2 when the $FSM_{po}$ is 1.

The table 3 shows a phase FSM ($FSM_{ph}$) and phase difference between antennas corresponding to the phase FSM in the mode 2.

According to these data, the weight vectors $w_1$ and $w_2$ are generated in accordance with the expression (4) shown below. Note that the upper part of the right side member of the expression (4) represents the weight vector $w_1$, and the lower part of the right side member of the expression (4) represents the weight vector $w_2$.

$$w = \begin{bmatrix} \sqrt{power\_ant1} \\ \sqrt{power\_ant2} \exp(jphase\_diff) \end{bmatrix} \quad (4)$$

In the mode 2, if the FSM signal transmitted from the CDMA wireless mobile station 125 is received in an incomplete state in the CDMA wireless base station 101 due to the data loss or the like, the FSM signal used when generating the weight vector $w_1$ and the weight vector $w_2$ in the CDMA wireless base station 101 and the FSM signal used in the channel estimation in the CDMA wireless mobile station 125 are not equal to each other. Therefore, there is the possibility that reception characteristics are deteriorated in some cases. For its solution, simple antenna detection is performed in the rake unit 137 in the manner described below.

Note that, in the CDMA wireless mobile station 125, the CPICH 1 vector 305 of the n th finger unit is represented as a CPICH 1, n, the CPICH 2 vector 304 of the n th finger unit is represented as a CPICH 2, n, and the DPCCH pilot vector 306 of the n th finger unit is represented as a DPCCH pilot n for convenience of explanation, and they are described as follows.

$$CPICH1,n = CPICH\_I1n + jCPICH\_Q1n \quad (5)$$

$$CPICH2,n = CPICH\_I2n + jCPICH\_Q2n \quad (6)$$

$$DPCCHpilotn = DPCCHpilot\_In + jDPCCHpilot\_Qn \quad (7)$$

The finger-antenna detection unit 135 performs the following calculations in accordance with the expressions (8) to (12) based on the CPICH 1 vector 305 and the CPICH 2 vector 304 outputted from the CPICH 1 vector detection unit 301 and the CPICH 2 vector detection unit 302, and then, performs an arithmetic expression of Pii, n, Pqq, n, Piq, n, Pqi, n, and Pgain, n. Thereafter, the finger-antenna detection unit 135 outputs the signal 167 representing the result of the arithmetic operation to the antenna detection data combining unit 307.

$$Pii,n = CPICH\_I2n \times DPCCHpilot\_In \quad (8)$$

$$Pqq,n = CPICH\_Q2n \times DPCCHpilot\_Qn \quad (9)$$

$$Piq,n = CPICH\_I2n \times DPCCHpilot\_Qn \quad (10)$$

$$Pqi,n = CPICH\_Q2n \times DPCCHpilot\_In \quad (11)$$

$$PgaIn,n = CPICH\_I1n \times DPCCHpilot + CPICH\_Q1n \times DPCCHpilot\_Qn \quad (12)$$

The antenna detection data combining unit 307 combines the signals 167 outputted from the finger units 129 to 132 in the manner as shown in the following expression (13), and outputs the combined signals 309 to the antenna calculating unit 308.

$$Pii = \sum_{n}^{Finger} Pii, n \quad (13)$$

$$Pqq = \sum_{n}^{Finger} Pqq, n$$

$$Piq = \sum_{n}^{Finger} Piq, n$$

$$Pqi = \sum_{n}^{Finger} Pqi, n$$

$$Pgain = \sum_{n}^{Finger} Pgain, n$$

The antenna calculating unit 308 selects one of the combined signals 309 from the antenna detection data combining unit 307 so as to generate the largest arithmetic operation result in accordance with the expressions (14) to (21), and selects the phase $FSM_{ph}$ corresponding to the selected arithmetic operation result from the table 3. For example, in the case where the expression (14) can generate the largest arithmetic operation result, when referring to the table 3 based on the (0) of the [Pg (0)] on the left side member of the expression (14), the phase difference between antennas of the fourth lowest on the right side of the table 3 is [0]. Therefore, the phase $FSM_{ph}$ corresponding to this, that is, [110] is selected.

$$Pg(0) = (Pii + Pqq) \quad (14)$$

$$Pg(45) = 0.707 \times (Pii - Pqi + Piq + Pqq) \quad (15)$$

$$Pg(90) = (-Pqi + Piq) \quad (16)$$

$$Pg(135) = 0.707 \times (-Pii - Pqi + Piq - Pqq) \quad (17)$$

$$Pg(180) = (-Pii - Pqq) \quad (18)$$

$$Pg(135) = 0.707 \times (-Pii + Pqi - Piq - Pqq) \quad (19)$$

$$Pg(-90) = (Pqi - Piq) \quad (20)$$

$$Pg(-45) = 0.707 \times (Pii + Pqi - Piq + Pqq) \quad (21)$$

Next, the phase $FSM_{ph}$ corresponding to the selected phase ph is selected from the table 2. Then, the $FSM_{po}$ representing the power is determined by the comparison shown below.

$$\text{if } PgaIn > Pg(ph) \text{ then } FSM(po) = 1 \quad (22)$$

$$\text{eise } FSM(po) = 0 \quad (23)$$

Also, since the number of the FSMs updated at the slot timing is one (one bit), the FSM estimation is performed only to the one FSM newly updated in the CDMA wireless base station, and other FSMs (three bits) are kept in the state of the value estimated previously. In this manner, it is possible to further reduce the calculations.

As described above, the rake-antenna detection unit 139 calculates the antenna compensation FSM 153 including the three bits $FSM_{ph}$ selected based on the expressions (14) to (21) and the one bit FSMP, selected based on the expressions (22) and (23), and transmits the antenna compensation FSM 153 to the channel compensation/estimation unit 134. Note that the antenna compensation FSM 153 can be transmitted by the four bits together. However, it is also possible to transmit it by each one bit. In this case, the latter is more preferable.

2. Second Embodiment

[Description of Configuration]

FIG. 5 is a block diagram showing a schematic internal configuration of a finger unit 129 and a rake unit 137 according to the second embodiment of the present invention, and it corresponds to FIG. 3 in the first embodiment.

The finger unit 129 shown in FIG. 5 comprises: a CPICH 1 vector detection unit 301 for detecting a CPICH 1 vector 305 at the time t and time t–t0 by performing processes for smoothing such as filtering and averaging by the use of a plurality of CPICH 1 signals in the limited time period; and a phase difference detection unit 601 for detecting the phase difference at every unit time to by the use of the CPICH 1 vector 305 detected in the CPICH 1 vector detection unit 301.

The rake unit 137 comprises a velocity determination unit 602 that includes: a phase difference detection data combining unit 603 for combining phases 605 detected in the phase difference detection unit 601; and a velocity calculating unit 604 for performing phase determination from combined data 606 combined in the phase difference detection data combining unit 603 and for calculating a passing velocity V607 by the use of the frequency based on the selected phase difference Δθ and the unit time t0.

[Description of Operation]

First, the CPICH 1 vector detection unit 301 performs processes for smoothing such as filtering and averaging by the use of a plurality of CPICH 1 signals in the limited time period and detects the CPICH 1 vector 305 at the time t and time t−t0 by the use of the expressions (24) and (25), and then, outputs the detection result to the phase difference detection unit 601.

$$CPICH1(t),n = CPICH\_I1(t)n + jCPICH\_Q1(t)n \quad (24)$$

$$CPICH1(t-t0),n = CPICH\_I1(t-t0),n + jCPICH\_Q1(t-t0),n \quad (25)$$

CPICH1(t),n: CPICH 1 vector of finger unit n at time t
CPICH1(t−t0),n: CPICH 1 vector of finger unit n at time t−t0

The phase difference detection unit 601 assigns the CPICH 1 vector 305 outputted from the CPICH 1 vector detection unit 301 to the following expressions (26) to (29) to detect the phase difference Vii, n, Vqq, n, Viq, n, and Vqi, n per a certain unit time t0, and then, outputs detection results 605 to the side of the rake unit 137.

$$Vii,n = CPICH\_I1(t),n \times CPICH\_I1(t-t0)n \quad (26)$$

$$Vqq,n = CPICH\_Q1(t),n \times CPICH\_Q1(t-t0)n \quad (27)$$

$$Viq,n = CPICH\_I1(t),n \times CPICH\_Q1(t-t0)n \quad (28)$$

$$Vqi,n = CPICH\_Q1(t),n \times CPICH\_I1(t-t0)n \quad (29)$$

In the rake unit 137, the phase difference detection data combining unit 603 adds the detection results 605 outputted from the finger units 129 to 132 by the use of the expression (30) to generate the combined data 606, and then, outputs the combined data to the velocity calculating unit 604.

$$Vii = \sum_{n}^{Finger} Vii, n \quad (30)$$

$$Vqq = \sum_{n}^{Finger} Vqq, n$$

$$Viq = \sum_{n}^{Finger} Viq, n$$

$$Vqi = \sum_{n}^{Finger} Vqi, n$$

The velocity calculating unit 604 performs a phase determination based on the combined data 606 outputted from the phase difference detection data combining unit 603 in the same manner as that in the first embodiment.

Note that a calculation example in the case where the accuracy of the phase is doubled in comparison to that in the first embodiment and Vg (ph), ph is set to 0, 22.5, 45, 67.5, 90, 112.5, 135, 157.5, 180, −157.5, −112.5, −90, −67.5, −45, and −22.5 is as follows. Even if the phase accuracy is improved, the increase of the amount of calculation in the rake unit 137 is only a fraction of the increase in the finger units 129 to 132. Therefore, the load on the wireless mobile station itself is not so much increased.

By comparing these Vg (ph) and selecting the largest Vg (ph), the ph is defined and obtained as the phase difference result Δθ.

$$Vg(0) = (Vii + Vqq) \quad (31)$$

$$Vg(22.5) = 0.924 \times (Vii + Vqq) + 0.383 \times (-Vqi + Viq) \quad (32)$$

$$Vg(45) = 0.707 \times (Vii - Vqi + Viq + Vqq) \quad (33)$$

$$Vg(67.5) = 0.383 \times (Vii + Vqq) + 0.924 \times (-Vqi + Viq) \quad (34)$$

$$Vg(90) = (-Vqi + Viq) \quad (35)$$

$$Vg(112.5) = -0.383 \times (Vii + Vqq) + 0.924 \times (-Vqi + Viq) \quad (36)$$

$$Vg(135) = 0.707 \times (-Vii - Vqi + Viq - Vqq) \quad (37)$$

$$Vg(157.5) = -0.924 \times (Vii + Vqq) + 0.383 \times (-Vqi + Viq) \quad (38)$$

$$Vg(180) = (-Vii - Vqq) \quad (39)$$

$$Vg(157.5) = -0.924 \times (Vii + Vqq) - 0.383 \times (-Vqi + Viq) \quad (40)$$

$$Vg(135) = 0.707 \times (-Vii + Vqi - Viq - Vqq) \quad (41)$$

$$Vg(112.5) = -0.383 \times (Vii + Vqq) - 0.924 \times (-Vqi + Viq) \quad (42)$$

$$Vg(-90) = (Vqi - Viq) \quad (43)$$

$$Vg(-67.5) = 0.383 \times (Vii + Vqq) - 0.924 \times (-Vqi + Viq) \quad (44)$$

$$Vg(-45) = 0.707 \times (Vii + Vqi - Viq + Vqq) \quad (45)$$

$$Vg(-22.5) = 0.924 \times (Vii + Vqq) - 0.383 \times (-Vqi + Viq) \quad (46)$$

Furthermore, the velocity calculating unit 604 calculates a frequency f in accordance with the expression 47 based on the selected phase difference Δθ and the unit time t0, and obtains the moving velocity V607 in accordance with the expression (48) on assumption that the frequency f is a Doppler frequency fD, radio wave frequency is set to λ, and carrier wave frequency is set to fc, and then, outputs the moving velocity V607.

$$fD = \frac{v}{\lambda} = \frac{V[\text{km/h}]/3.6}{3.0 \times 10^8 / fc} \quad (47)$$

$$f = \frac{\Delta\theta}{t0} \quad (48)$$

According to the present invention as described above, since the finger unit and the rake unit share the calculation, it is possible to reduce the load on the wireless mobile station.

Also, according to the present invention, it is possible to simplify the circuit including the finger unit and the rake unit and to make the circuit size compact, and also to reduce the power consumption. Especially, since the estimation of the phase and the power is performed independently in the transmission diversity in which the phase and the power are mixed, it is possible to reduce the load on the wireless mobile station.

What is claimed is:

1. A wireless mobile station comprising:
   a plurality of finger units for performing spread demodulation of each of downstream signals transmitted from a plurality of antenna units of a base station through different transmission channels, each of said finger units including a channel compensation and estimation unit; and a rake unit for combining the spread-demodulated downstream signals which are outputted from each of said finger units, said rake unit including an antenna calculating unit that performs an antenna calculation based on outputs from each of said finger units, and that feeds back the antenna calculation to said channel compensation and estimation unit of each of said finger units, wherein each of said finger units and said rake unit share and perform arithmetic operation for compensating channel estimation of the spread-demodulated downstream signal, wherein each of said finger units calculates a product of a plurality of downstream physical channel vector signals and a dedicated physical control channel pilot, and wherein said rake unit combines the calculation results calculated in the each of said finger units, wherein each of said finger units comprises:
  a first common pilot channel vector detection unit configured to detect a first common pilot channel vector in the downstream signal;
  a second common pilot channel vector detection unit configured to detect a second common pilot channel vector in the downstream signal; and
  an FSM estimation unit configured to receive the first and second common pilot channel vectors output from the first and second common pilot channel vector detection units, and to compute an estimation value signal that is provided to the FSM combining unit of said rake unit; and
  a finger-antenna detection unit configured to perform arithmetic operations based on the first and second common pilot channel vectors output from the first and second common pilot channel vector detection units; and wherein said rake unit comprises:
  a Finite State Machine (FSM) combining unit;
  an antenna detection data combining unit configured to combine signals outputted by each of said finger-antenna detection units of said plurality of finger units; and
  an antenna calculating unit configured to select one of the combined signals output by said antenna detection unit so as to generate a largest arithmetic operation result, wherein said FSM estimation unit transmits an estimation value signal based on the first and second common pilot channel vectors to said FSM combining unit.

* * * * *